(12) United States Patent
Higgins

(10) Patent No.: US 6,309,154 B1
(45) Date of Patent: Oct. 30, 2001

(54) TORQUE-LIMITING ASSEMBLY

(75) Inventor: Paul D. Higgins, Glen Mills, PA (US)

(73) Assignee: Vibro-Meter S.A., Fribourg (CH)

(*) Notice: Subject to any disclaimer, the term of this patent is extended or adjusted under 35 U.S.C. 154(b) by 0 days.

(21) Appl. No.: 09/420,202

(22) Filed: Oct. 18, 1999

(51) Int. Cl.[7] .................................................. F16B 31/02
(52) U.S. Cl. ................................................. 411/7; 81/475
(58) Field of Search ........................... 44/1, 6, 7, 8, 119, 44/120, 121; 81/472–475

(56) References Cited

U.S. PATENT DOCUMENTS

| | | | |
|---|---|---|---|
| 2,685,812 | * | 8/1954 | Dimitoff . |
| 3,289,524 | * | 12/1966 | Rubin . |
| 3,425,314 | * | 2/1969 | Ohlson . |
| 4,100,491 | * | 7/1978 | Newman . |
| 4,176,582 | * | 12/1979 | Witte . |
| 4,687,392 | * | 8/1987 | Bidwell . |
| 5,083,819 | | 1/1992 | Bynum . |
| 5,362,110 | | 11/1994 | Bynum . |
| 5,583,441 | * | 12/1996 | Bitts . |
| 5,586,790 | | 12/1996 | Bynum . |
| 5,606,753 | * | 3/1997 | Hashimoto . |
| 5,877,690 | | 3/1999 | Tally . |

FOREIGN PATENT DOCUMENTS 0 588 482 A2  3/1994  (EP) .

* cited by examiner

Primary Examiner—Flemming Saether
(74) Attorney, Agent, or Firm—Woodcock Washburn Kurtz Mackiewicz & Norris LLP

(57) ABSTRACT

A torque-limiting assembly includes a collar, a locking ring, and a sleeve member. The collar is co-axially and rotatably coupled to a fitting. The locking ring is non-rotatably coupled to the collar, and includes a plurality of elongate tangs arranged circumferentially around the ring. The sleeve member is non-rotatably and co-axially coupled to the fitting, and has a plurality of contact surfaces that form an outer circumference of the sleeve member. Torque is applied to the collar by way of a plurality of substantially flat surfaces disposed along an outer circumference of the collar. The torque is transferred to the locking ring by way of the fixed geometric relationship between the collar and the ring. The locking-ring tangs securely grasp the sleeve-member contact surfaces when the applied torque is below a predetermined amount, and thereby transfer a substantial entirety of the applied torque to the fitting. The tangs flex and slip along the contact surfaces when the applied torque exceeds the predetermined amount, thereby preventing torque greater than the predetermined amount from being transferred to the fitting.

25 Claims, 6 Drawing Sheets

TORQUE-LIMITING ASSEMBLY

FIELD OF THE INVENTION

The invention relates to torque-limiting devices. More particularly, the invention provides an assembly that transfers a limited amount of torque between a wrenching device and a fitting.

BACKGROUND OF THE INVENTION

Mechanical fittings are often coupled to another component (a "mating component") through the use of threads disposed on the fitting and the mating component. Typically, the threads of the fitting and the mating component are securely joined by applying a torque to the fitting. The inadvertent application of excessive torque can damage the threads of the fitting or the mating component. Such damage can prevent the effective mating of the fitting and the mating component, and may necessitate repair or replacement of the fitting or the mating component. Torque-limiting devices are utilized to prevent this type of damage. Torque-limiting devices facilitate the transfer of a limited amount of torque between a torque-applying device, e.g., a wrench or a socket, and the fitting.

Torque-limiting devices typically limit torque in one of two ways. One type of torque-limiting device relies exclusively on friction. In particular, one or more sliding surfaces within these types of devices generate a frictional force as the surfaces translate in response to the applied torque. The frictional force limits the amount of torque that can be transferred to the fitting.

Another type of torque-limiting device relies on mechanical interference. Specifically, a component within the device is placed in contact against another component in a manner that facilitates the transfer of torque between the components. A spring-loaded mechanism holds the components in contact while the applied torque is below a particular value. The spring-loaded mechanism allows the components to separate when the applied torque exceeds a predetermined value, thereby preventing the transmission of torque levels above that value.

Commonly-used torque-limiting devices have a number of substantial drawbacks. For example, the limiting torque produced by such devices usually changes after repeated use of the device. This characteristic is due to wear of the friction-producing surfaces, or permanent stretching of the springs that facilitate the torque-limiting function. Hence, an optimum limiting torque is difficult to maintain throughout the useful life of such devices.

In addition, the springs utilized in spring-loaded devices are usually large, and cannot be integrated into the device in a manner that minimizes the overall dimensions of the device. Furthermore, spring-loaded devices usually have a high parts count, and rely on relatively complicated mechanical interactions between their individual component parts. These characteristics add size and weight to the device, and tend to decrease reliability. Furthermore, spring-loaded devices usually incorporate a number of relatively fragile components. Hence, spring-loaded devices are not particularly suited for use in high-vibration, high-temperature, or corrosive environments.

Both friction-based and spring-loaded torque-limiting devices are susceptible to contamination by foreign materials. Specifically, friction-based devices are particularly susceptible to contamination by grease, oil, and other commonly-used lubricants, as these types of materials alter the coefficients of friction on the friction-producing surfaces. Spring-loaded devices can be affected by foreign materials that collect on the torque-transferring surfaces within the device. In particular, the presence of such materials can reduce the effective contact area of the surfaces, and thereby alter the limiting torque.

Thus, a need exists for a torque-limiting device of compact size and low complexity. In addition, it is desirable that the device be suitable for use under harsh operating conditions, e.g., in high-vibration or high-temperature environments. Furthermore, the device should be capable of producing a limiting torque that changes minimally over the useful life of the device. Also, the device should be capable of satisfactory operation in the presence of common contaminants such as lubricating materials. The present invention is directed to these and other goals.

SUMMARY OF THE INVENTION

An object of the present invention is to provide an assembly for limiting an amount of torque transferred between a torque-applying device and a fitting. A presently-preferred embodiment of the torque-limiting assembly comprises a collar rotatably and coaxially coupled to the fitting. The collar has a plurality of circumferentially-disposed surfaces for engaging the torque-applying device. The torque-limiting assembly also includes a sleeve member non-rotatably coupled to at least one of the collar and the fitting. The sleeve member has a plurality of contact surfaces disposed along a circumference of the sleeve member.

The presently-preferred embodiment of the torque-limiting assembly also includes a locking ring non-rotatably coupled to at least one of the collar and the fitting. The locking ring has a plurality of elongate tangs that extend from a portion of the ring. The tangs are radially spaced from an axis of rotation of the fitting. The tangs are adapted to securely engage the sleeve-member contact surfaces on a selective basis.

Preferably, the tangs are adapted to securely engage the sleeve-member contact surfaces when a torque about equal to or less than a predetermined amount is applied to the collar. The secure engagement of the tangs and the contact surfaces causes torque levels about equal to or less that the predetermined amount to be transferred to the fitting. The tangs are preferably adapted to slip over the sleeve-member contact surfaces when a torque greater than the predetermined amount is applied to the collar. The slipping of the tangs prevents torque levels greater than the predetermined amount from being transferred to the fitting.

A further object of the present invention is to provide a housing for removably coupling a probe to a mounting structure. A presently-preferred embodiment of the housing comprises a main portion having a central passage for removably receiving the probe. The housing main portion also includes a plurality of threads for engaging the mounting structure in response to an installation torque. The housing also includes a collar rotatably and coaxially coupled to the main portion. The collar has a plurality of circumferentially-disposed surfaces for transferring the installation torque. The housing further includes a sleeve member non-rotatably coupled to at least one of the collar and the main portion. The sleeve member has a plurality of contact surfaces disposed along a circumference of the sleeve member.

The presently-preferred embodiment of the housing also comprises a locking ring non-rotatably coupled to at least one of the collar and the main portion. The locking ring has a plurality of elongate tangs extending from a portion of the ring. The tangs are radially spaced from a central axis of the main portion. Preferably, the tangs are adapted to non-rotatably engage the sleeve-member contact surfaces when the installation torque is about equal to or less than a predetermined limit. The non-rotatable engagement of the tangs and the contact surfaces causes the installation torque to be transferred to the main portion when the installation torque is about equal to or less than the predetermined limit.

The tangs are preferably adapted to flex and ratchet over junctures between the sleeve-member contact surfaces when the installation torque is greater than the predetermined limit. The flexing and ratcheting of the tangs prevents the installation torque from being transferred to the main portion when the installation torque is greater than the predetermined limit.

Another object of the present invention is to provide a chip-detector assembly for use with a machine having a lubrication system. A presently-preferred embodiment of the chip-detector assembly comprises a probe having a chip-detecting element.

The presently-preferred embodiment of the chip-detector assembly also comprises a housing having a main portion. The housing main portion includes a central passage for removably receiving the probe. The main portion also has an outer circumferential surface adapted to engage the machine in response to an installation torque applied to the housing by a torque-applying device.

The housing also includes a torque-limiting assembly. The toque-limiting assembly comprises a collar rotatably and coaxially coupled to the housing main portion. The collar has a plurality of circumferentially-disposed surfaces for engaging the torque-applying device. The torque-limiting assembly also comprises a sleeve member non-rotatably coupled to at least one of the collar and the main portion. The sleeve member has a plurality of contact surfaces disposed along a circumference of the sleeve member.

The torque-limiting assembly also includes a locking ring non-rotatably coupled to at least one of the collar and the main portion. The locking ring has a plurality of elongate tangs extending from a portion of the locking ring. The tangs are radially spaced from a central axis of the main portion. Preferably, the tangs are adapted to securely engage the sleeve-member contact surfaces when the installation torque is about equal to or less than a predetermined amount. The secure engagement of the tangs and the contact surfaces causes the installation torque to be transferred to the housing main portion when the installation torque is about equal to or less than the predetermined amount.

The tangs are preferably adapted to slip over the sleeve-member contact surfaces when the installation torque is greater than the predetermined amount. The slipping of the tangs prevents the installation torque from being transferred to the housing main portion when the installation torque is greater than the predetermined amount.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed the drawings. In the drawings.

DESCRIPTION OF PREFERRED EMBODIMENTS

Figure 1:
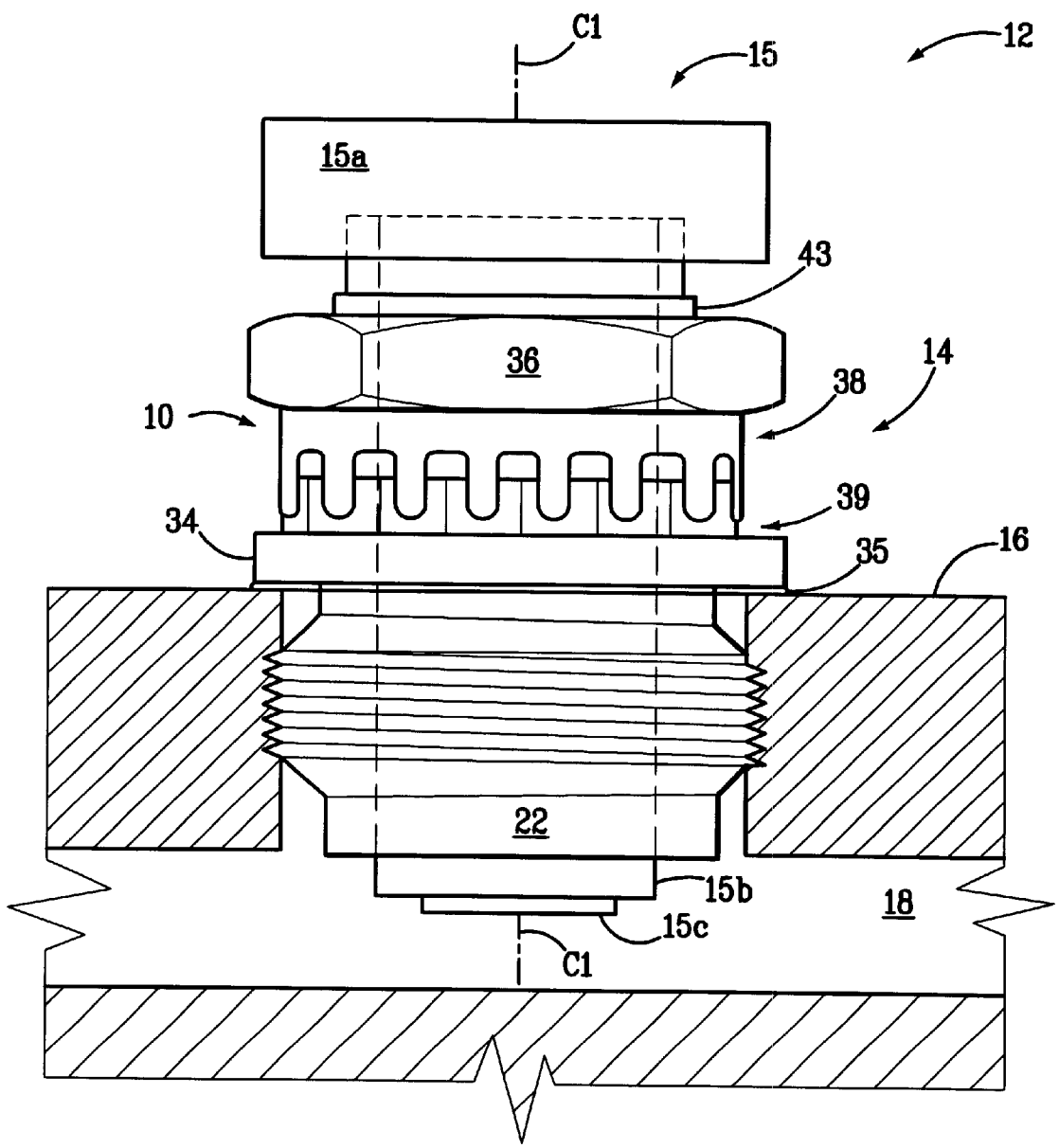
FIG. 1 is a side view of a chip-detector assembly that incorporates the torque-limiting assembly of the present invention.
Figure 2:
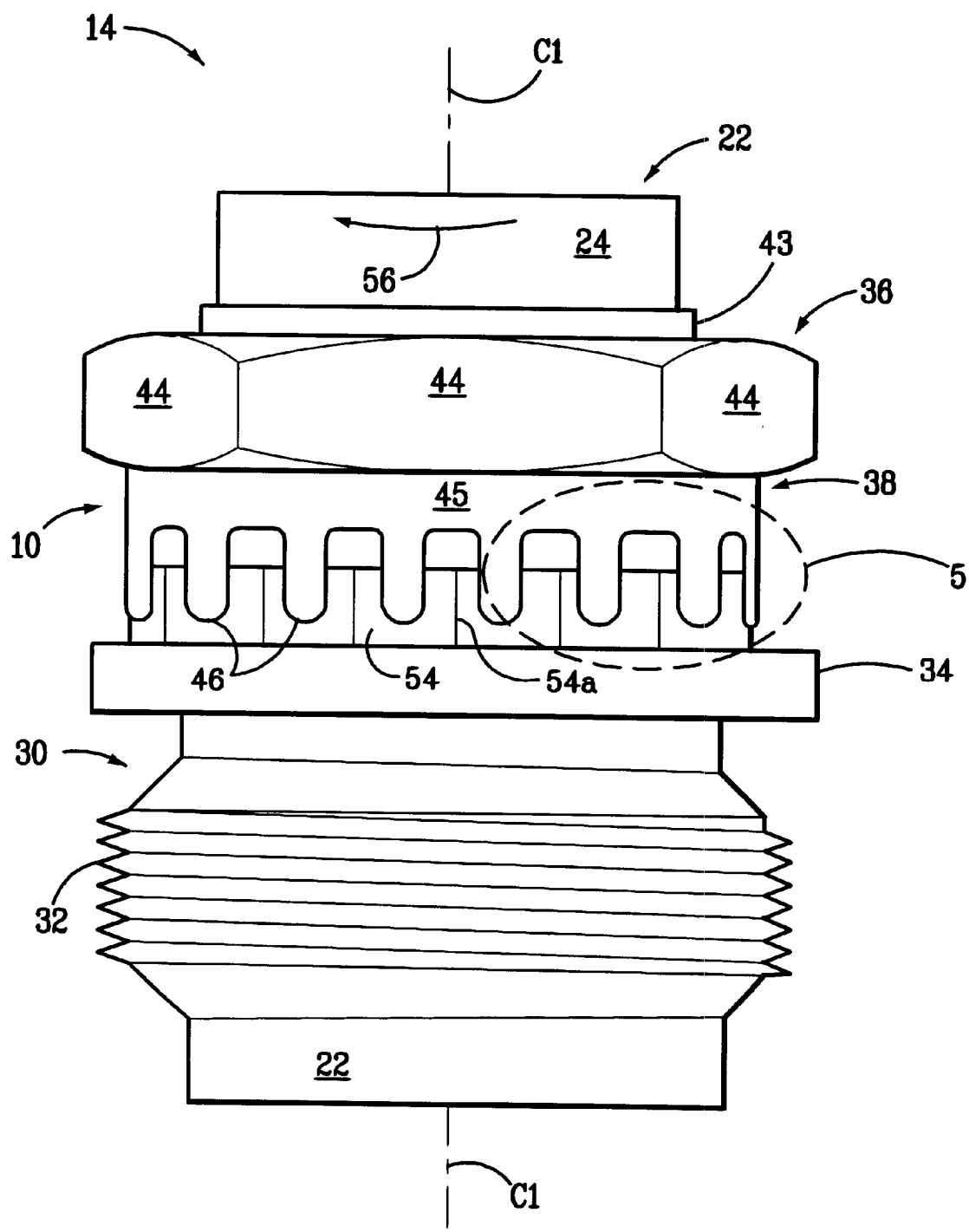
FIG. 2 is a side view of the torque-limiting assembly and a housing of the chip-detector assembly shown in FIG. 1.

The invention provides an assembly for limiting an amount of torque that may be transferred from a torque-applying device to a fitting. A presently-preferred embodiment of the invention is described in conjunction with a chip-detector assembly for use with a mechanical component having a lubrication system. This particular embodiment is described for illustrative purposes only, as the invention can readily be adapted to devices other than chip detector assemblies.

A presently-preferred embodiment of the invention is shown in FIGS. 1 through 6. The invention comprises a torque-limiting assembly 10. The torque-limiting assembly 10 is incorporated into a chip-detector assembly 12 (see FIG. 1). The chip-detector assembly 12 is adapted for use with a mechanical component or machine having a lubrication system, e.g., a gas turbine engine (this machine or component is hereinafter referred to as a "mating component").

The chip-detector assembly 12 includes a housing 14 that incorporates the torque-limiting assembly 10. The chip-detector assembly 12 also includes a probe 15 (see FIG. 1). The housing 14 is fixed to a portion 16 of the mating component. The portion 16 is located proximate a passage 18 within the mating component. The passage 18 is used to circulate lubricating fluid within the mating component.

The probe 15 is adapted to removably engage the housing 14, as shown in FIG. 1. The probe 15 may be secured to the housing using, for example, a plurality of interlocking pins and slots (not shown) disposed on the probe 15 and the housing 14. The probe 15 includes a collar 15a, a shaft 15b, and a chip-detecting element 15c. The collar 15a and the chip-detecting element 15c are disposed at opposing ends of the shaft 15b. The chip-detecting element 15c may comprise, for example, a magnet. Insertion of the probe 15 into the housing 14 causes the chip-detecting element 15c to protrude into the passage 18, thereby exposing the element 15c to the circulating lubricant while the mating component is operating.

Magnetizable debris suspended in the lubricant stream is attracted to and retained by the chip-detecting element 15c. The presence of such debris provides an indication of an impending failure of an oil-wetted part. Hence, an impending failure of an oil-wetted part can be discovered by periodic removal and inspection of the probe 15. (Detailed descriptions of the probe 15 and the probe-housing interface are not necessary to an understanding of the invention; thus, the probe 15 and the probe-housing interface are not described in further detail.)

Figure 3:
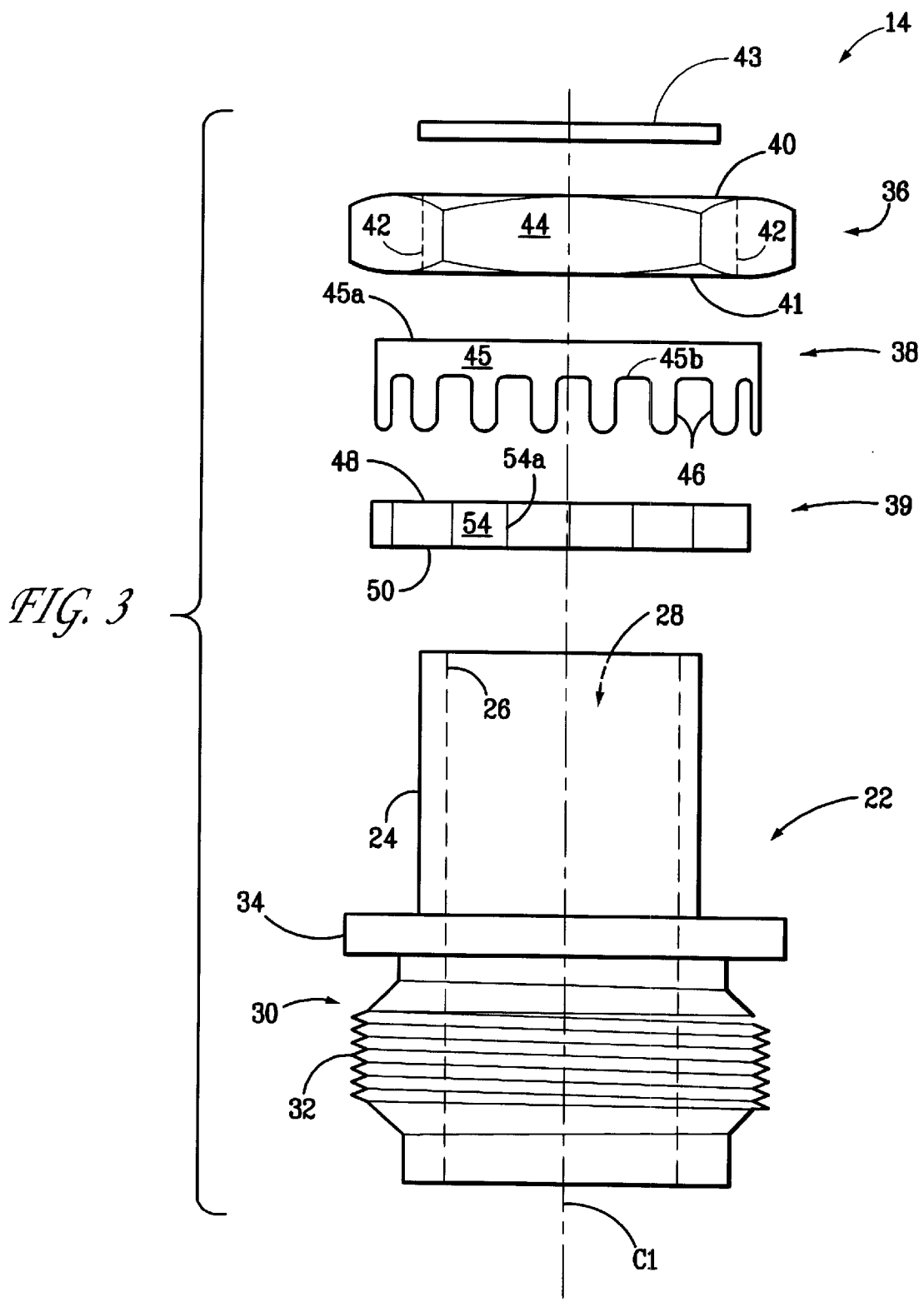
FIG. 3 is an exploded view of the housing and the torque-limiting assembly shown in FIGS. 1 and 2.
Figure 4:
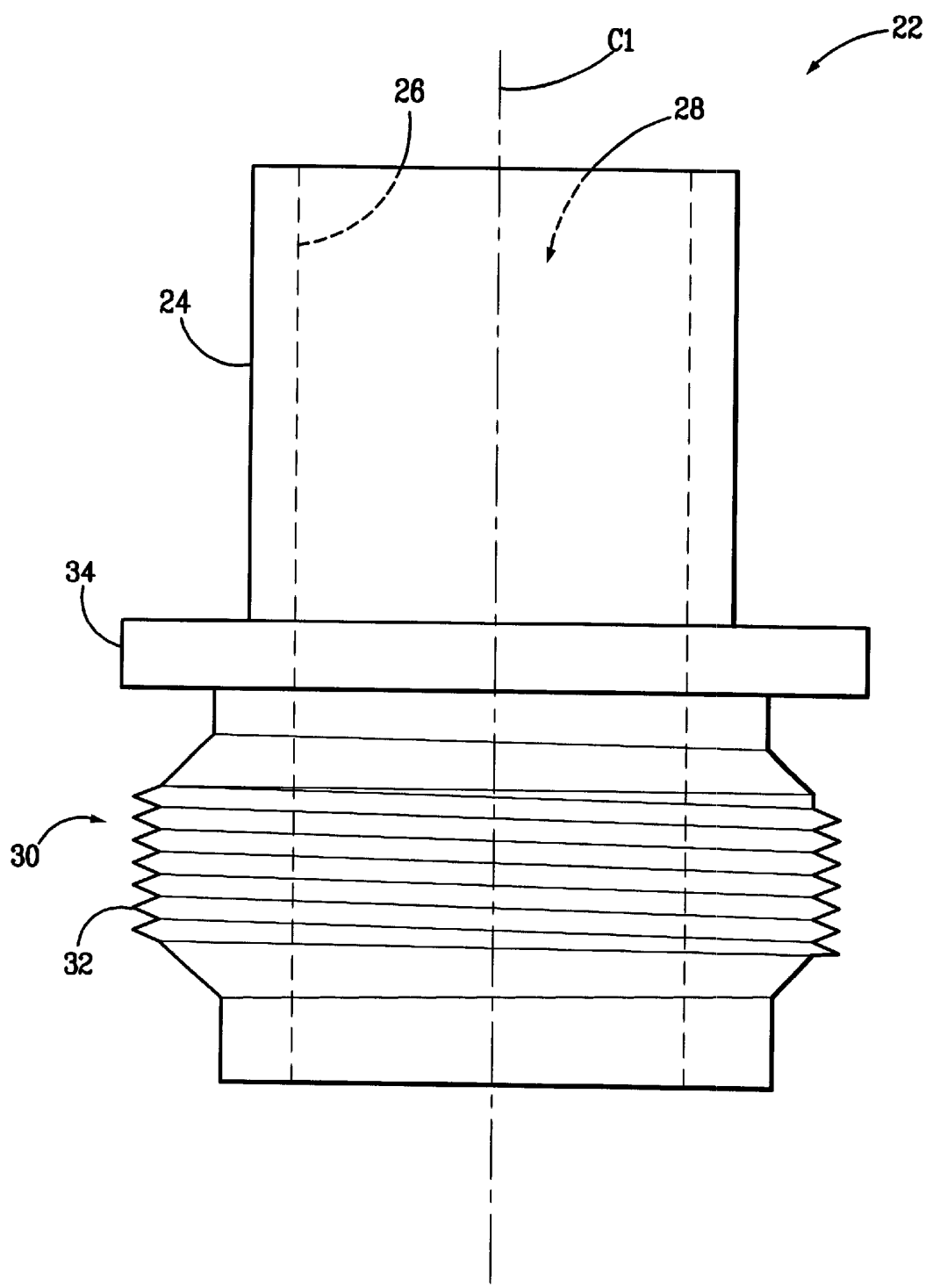
FIG. 4 is a side view of a main portion view of a main portion of the housing shown in FIGS. 1 through 3.

The housing 14 is most clearly shown in FIGS. 3 and 4. The housing 14 includes a main portion 22. The main portion 22 has an outer circumferential surface 24 and an inner circumferential surface 26. The surfaces 24 and 26 each have a substantially circular cross section. The inner circumferential surface 26 defines a central passage 28. The central passage 28 extends along a central axis C1 of the housing 14. The central passage 28 accommodates the probe shaft 15b.

The outer circumferential surface 24 includes a mounting portion 30. A plurality of threads 32 are disposed on the mounting portion 30. The threads 32 engage a corresponding set of threads on the portion 16 of the mating component, thereby fixing the housing 14 to the mating component. The main body also includes a flange 34. The flange 34 abuts the portion 16 by way of an O-ring 35 when the housing 14 is installed in the mating component (see FIG. 1).

Structural details of the torque-limiting assembly 10 are as follows. The torque-limiting assembly 10 includes a collar 36, a locking ring 38, and a sleeve member 39. The collar 36 has an upper surface 40, an opposing lower surface 41, and a substantially circular inner circumferential surface 42 (see FIG. 3). The collar 36 is rotatably and co-axially coupled to the main portion 22 of the housing 14. In particular, the inner circumferential surface 42 of the collar 36 is positioned around the outer circumferential surface 24 of the main portion 22. The diameters of the surfaces 42 and 24 are such that a clearance exists between the surfaces 42 and 24, thereby allowing the collar 36 to rotate in relation to the main portion 22.

Figure 7:
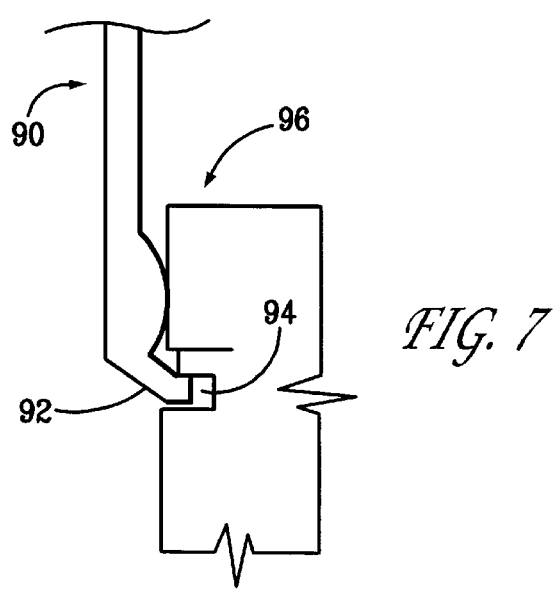
FIG. 7 is a side view of an alternative embodiment of the tang shown in FIG. 6.

The collar 36 is restrained from upward axial movement by a retaining ring 43. The retaining ring 43 is fixed to the surface 24 of the main portion 22, directly above the collar upper surface 40. The retaining ring 43 may be, for example, a C-clip. (The terms "upper," "lower," "above," and "below," as used throughout the specification and claims, reference the component orientations depicted in the drawings. These terms are used for illustrative purposes only, and are not intended to be otherwise limiting.) An alternative restraining means is illustrated in FIG. 7. FIG. 7 shows a tang 90 equipped with a projecting lip 92. The lip 92 engages a circumferential groove 94 in a sleeve member 96. The engagement of the lip 92 and the groove 94 provides axial retention of the collar 36 and the locking ring 38. Other embodiments of the invention may forgo the use of a separate restraining means for the collar 36 and rely instead on the interference which is normally present between the locking ring 38 and the sleeve member 39 (this interference is described in detail below).

A plurality of substantially flat surfaces 44 are circumferentially disposed around an outer circumference of the collar 36. The surfaces 44 engage a torque-applying device, e.g., a wrench or a socket, when the housing 14 is mated to the mating component. Hence, the installation torque that couples the housing 14 to the mating component is applied through the surfaces 44. The collar 36 preferably includes a total of six surfaces 44 disposed in a hexagonal arrangement.

The locking ring 38 includes a circumferential portion 45 having a first edge 45a and an opposing second edge 45b (see FIG. 3). The locking ring 38 also includes a plurality of elongate tangs 46. Each tang 46 adjoins the edge 45b of the circumferential portion 45. Preferably, the circumferential portion 45 and the tangs 46 are unitarily formed. The longitudinal axis of each tang 46 is substantially perpendicular to the edge 45b, and the spacing between adjacent tangs 46 is about equal in the exemplary embodiment (embodiments that do not incorporate these particular geometric features are also within the contemplated scope of the invention). The tangs 46 are preferably formed from a hard, durable, and strong material. For example, the tangs 46 of exemplary embodiment are formed from Inconel alloy, a product of Inco., Inc. (The International Nickel Company).

Figure 6:
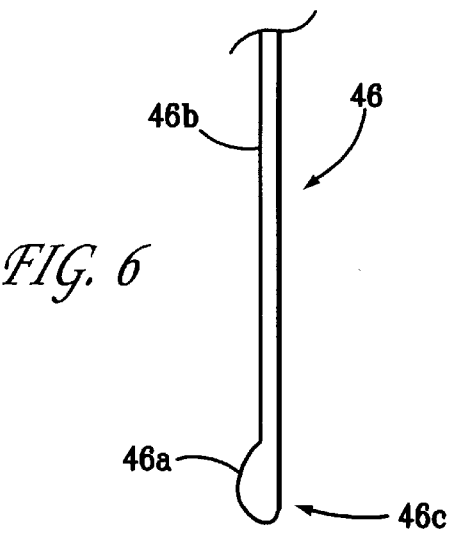
FIG. 6 is a side view of a tang of the torque-limiting assembly shown in FIGS. 1 through 3.

Each tang 46 includes a knob 46a (see FIG. 6). The knob 46a protrudes from an inner surface 46b of the tang 46, proximate an end 46c of the tang. Hence, each knob 46a projects radially inward from the corresponding surface 46b. The significance of the knobs 46a is explained below. Embodiments that do not incorporate knobs such as the knobs 46a also within the contemplated scope of the invention, i.e., the tang surfaces 46b may, in the alternative, be substantially flat. A total of sixteen tangs are utilized on the exemplary locking ring 38.

The locking ring 38 is non-rotatably coupled to the collar 36. Specifically, the edge 45a of the circumferential portion 45 is fixed to the lower edge 41 of the collar 36 (the locking ring 38 may be fixed to the collar 36 by other means, e.g., pressing the circumferential portion 45 over a downwardly-projecting flange (not shown) on the collar 36; alternatively, the collar 36 and the locking ring 38 may be unitarily formed). Hence, rotation of the collar 36 imparts a corresponding rotational movement to the locking ring 38. The significance of this relationship is explained in detail below. Coupling the locking ring 38 to the collar 36 in the noted manner causes the tangs 46 to be spaced apart from, and substantially parallel to, the central axis C1.

The sleeve member 39 has an upper surface 48 and an opposing lower surface 50.

Figure 5:
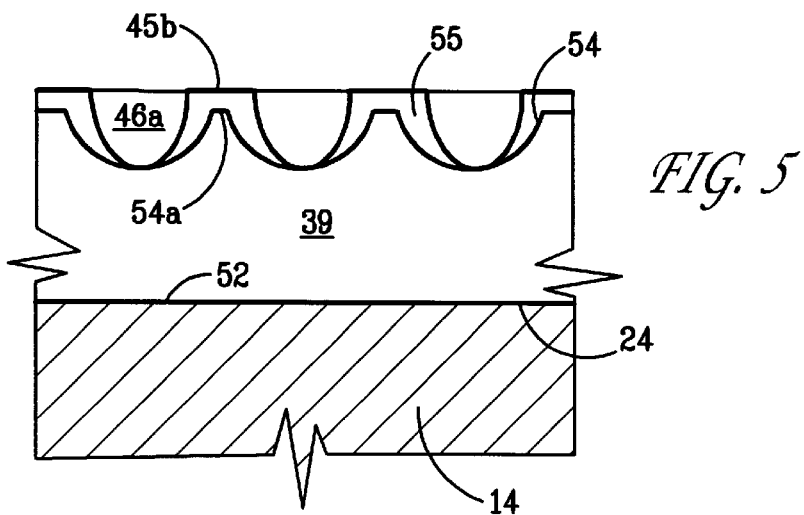
FIG. 5 is a bottom view of the area designated 5—5 in FIG. 2.

The sleeve member 39 also includes an inner circumferential surface 52 having a substantially circular cross-section. The sleeve member 39 further comprises a plurality of contact surfaces 54. The contact surfaces 54 form an outer circumference of the sleeve member 39. Each contact surface 54 has a substantially concave shape in the exemplary embodiment. The surfaces 54 each form a detent 55, as best shown in FIG. 5 (the curvature and depth of the detents 55 is exaggerated in the figures for illustrative purposes). The surfaces 54 are separated by peak-shaped junctures 54a. These features give the outer circumference of the sleeve member 39 a scalloped geometry. Contact surfaces 54 having other shapes, e.g., flat, are also within the contemplated scope of the invention. The number of contact surfaces 54 disposed along the sleeve member 39 is preferably equal to the number of tangs 46 disposed on the locking ring 38. The contact surfaces 54 may be disposed along the inner circumference 52 of the sleeve member 39 in alternative embodiments of the invention.

The sleeve member 39 is non-rotatably and co-axially coupled to the housing 14. In particular, the inner circumferential surface 42 of the sleeve member 39 is fixedly coupled to the outer circumferential surface 24 of the housing main portion 22. Hence, rotation of the sleeve member 39 imparts a corresponding rotational movement to the main portion 22. The sleeve member 39 may be fixed to the main portion 22 by, for example, an interference fit between the surfaces 42 and 24. Alternatively, the sleeve member 39 and the main portion 22 may be unitarily formed.

The tangs 46 engage the sleeve member contact surfaces 54 when the torque-limiting assembly 10 is coupled to the housing 14 as described above (see FIGS. 1, 3, and 5). In particular, the relative dimensions of the locking ring 38 and the sleeve member 39 are chosen so as to produce an interference fit between the tang knobs 46a and the contact surfaces 54. In the exemplary embodiment, the interference between each knob 46a and surface 54 is about 0.010 inches when the knob 46a is positioned at the approximate center of the contact surface 54, i.e., each tang 46 is displaced radially outward by about 0.010 inches when the tang 46 contacts the surface 54 as shown in FIG. 5.

The interference between the tangs knobs 46a and the contact surfaces 54 causes the relatively thin tangs 46 to flex radially outward. The resilience of the tangs 46 causes the knobs 46a to tightly engage the surfaces 54 in response to this flexing. The engagement of the knobs 46a and the surfaces 54 produces a contact force between each knob 46a and surface 54. The significance of the contact force between the knobs 46a and the surfaces 54 is explained in detail below. Furthermore, the resilience of the tangs 46, in conjunction with the concave profile of the surfaces 54, cause each tang knob 46a to reside in the approximate center of a corresponding detent 55 when external torque is not being applied to the torque-limiting assembly 10 (see FIG. 5).

The housing 14 is coupled to the portion 16 of the mating component by way of the threads 32 disposed on the housing 14, as noted above. Hence, an externally-applied torque is required to mount the housing 14 in the mating component. The torque-limiting assembly 10 transfers this torque, and limits the amount of torque that can be applied to the threads 32. The torque-limiting assembly 10 performs these functions in the following manner.

Installation torque is applied to the collar 36 by a torque-applying device such as a wrench or a socket. The installation torque is transferred to the locking ring 38 by virtue of the fixed geometric relationship between the collar 36 and the ring 38. The installation torque causes the collar 36 and the locking ring 39 to rotate about the central axis C1, in the direction denoted by the arrow 56 shown in FIG. 2.

Torque is transferred from the locking ring 38 to the sleeve member 39 by way of the tangs 46. More particularly, the contact force between the knobs 46a and the surfaces 54 prevents the knobs 46a from slipping in relation to the contact surfaces 54 when the installation torque is about equal to or below a particular value. This value is hereinafter referred to as the "limiting torque" of the assembly 10. The tangs 46 securely grasp the contact surfaces 54 when the installation torque is about equal to or below the limiting torque. Hence, the sleeve member 39 rotates in concert with the locking ring 38, and a substantial entirety of the installation torque is transferred to the sleeve member 38 when the installation torque is about equal to or below the limiting torque. The torque transferred to the sleeve member 39, in turn, is transferred to the housing main portion 22 (and the threads 32) by virtue of the fixed geometric relationship between the sleeve member 39 and the main portion 22.

Increasing the installation toque beyond the limiting torque causes the tang knobs 46a to slip in relation to the contact surfaces 54. This characteristic limits the amount of torque that can be transferred to the threads 32. Specifically, the housing main portion 22 reacts to the aggregate force applied to the main portion 22 by the tang knobs 46a via the sleeve member 39. The main portion 22 reacts by exerting a substantially equal and opposite force on the tangs 46 through the sleeve member 39. Application of increasing levels of installation torque to the collar 36 produces a corresponding increase in this reactive force.

The reactive force exerted by the main portion 22 eventually reaches a level sufficient to drive the tang knobs 46a from their positions at the center of each detent 55. This point occurs when the applied installation torque is about equal to the limiting torque. The concave shape of the surfaces 54 causes the tangs 46 to flex radially outward as the knobs 46a begin to slip along the surfaces 54. Hence, slippage of the tang knobs 46a occurs when the noted reactive force is sufficient to overcome the resilience of the tangs 46, plus the aggregate frictional force between the knobs 46a and the surfaces 54. The slippage of the knobs 46a prevents torque levels above the limiting torque from being transferred to the sleeve member 39 (and the threads 32).

Continued slippage of the knobs 46a eventually causes the knobs 46a to pass over the junctures 54a between adjoining surfaces 54. The peak-like geometry of the junctures 54a causes the tangs 46 to move over the junctures 54a with a ratcheting motion. The knobs 46a continue to slip and ratchet over the surfaces 54 and the junctures 54a as long as the installation torque exceeds the limiting torque, thereby preventing torque levels above the limiting torque from being transferred to the housing main portion 22. The dimensions of the tangs 46 and the sleeve member 39 are chosen such that the stresses within the tangs 46 remain within the elastic limit as the tangs 46 flex as noted. This provision ensures that the limiting torque remains substantially constant throughout the life of the torque-limiting assembly 10.

The limiting torque can be set at a desired value by manipulating the design parameters of the locking ring 38 and the sleeve member 39. In particular, the limiting torque is a function of the contact force between the tang knobs 46a and the sleeve member contact surfaces 54, as noted above. The contact force, in turn, is a function of the resilience, i.e., the effective spring constant, of the tangs 46. The contact force is also a function of the amount of interference between the tangs 46 and the contact surfaces 54.

The effective spring constant of the tangs 46 is dependent upon the dimensions of the tangs 46. The effective spring constant is also driven by the stiffness of the material from which the tangs 46 are formed. Hence, the limiting torque can be set at a desired value by manipulating the length (longitudinal dimension), width (circumferential dimension), and thickness (radial dimension) of the tangs 46. The limiting torque can also be manipulated by manufacturing the tangs 46 from a material having a particular elastic modulus. Furthermore, the limiting torque can be tailored to a particular value by sizing the locking ring 38 and the sleeve member 39 so as to produce a particular level of interference between the tangs 46 and the contact surfaces 54. For example, the length, width, and thickness of the tangs 46 are 0.380, 0.115, and 0.040 inches, respectively. The tangs 46 are manufactured from Inconel alloy having an elastic modulus of about $30 \times 10^6$ pounds per square inch. Furthermore, the interference between the tangs 46 and the contact surfaces 54 is about 0.010 inches, as noted above. These parameters yield an estimated limiting torque of about 30 inch-lbs. in the exemplary embodiment.

The present invention provides numerous advantages in relation to commonly-used torque-limiting devices. For example, the limiting torque of the torque-limiting assembly 10 can be precisely controlled, and changes in the limiting torque over the life of the assembly 10 can be minimized. Specifically, the limiting torque is primarily a function of the dimensions of the locking ring 38 and the sleeve member 39, as noted above. These dimensions can be controlled with a high degree of precision during the manufacturing process. Furthermore, wear of the tangs knobs 46a and the contact surfaces 54 can be minimized by periodic application of lubricating material, thereby minimizing dimensional changes in those components over the useful life of the torque-limiting assembly 10. In addition, the use of a relatively large number of tangs 46 minimizes the contact force that each tang 46 must produce in order for the locking ring 38 to securely grasp the sleeve member 39. Hence, the deflection of the tangs 46 is relatively low. This characteristic minimizes potential losses of resiliency in the tangs 46, and thereby minimizes potential changes in the limiting torque.

Common torque-limiting devices, in contrast, typically rely exclusively on frictional or spring forces to limit torque. These forces usually vary over the life of the torque-limiting device as friction-producing components undergo wear and springs lose a portion of their original resilience due to repeated stretching. Hence, the limiting torque in these type of devices will, in general, diminish with repeated usage. Furthermore, frictional forces are dependent upon material properties, i.e., coefficients of friction, as well as component dimensions. Hence, the limiting torque in such devices cannot be controlled exclusively through manufacturing tolerances, as in the present invention.

Furthermore, torque-limiting devices that rely exclusively on frictional forces are particularly susceptible to contamination by grease, oil, and other lubricants. In particular, the presence of lubricants on the friction-producing surfaces of such devices will alter the surfaces' coefficients of friction, thus affecting the limiting torque. The introduction of lubricating materials to the present invention, in contrast, is actually advantageous due to the wear-reducing effect of such materials.

Spring-loaded devices are also susceptible to contamination by foreign materials. Specifically, these materials can collect on the surfaces within the device that are used to transfer torque. The presence of such materials can reduce the effective contact area of the surfaces, and thereby alter the limiting torque. The present invention is not subject to this drawback, because the sliding motion of the tang knobs 46a over the surfaces 54 produces a wiping effect that removes contaminants from the contact area between the knobs 46a and the surfaces 54.

Further advantages of the present invention arise from the relative simplicity of the torque-limiting assembly 10. For example, the assembly 10 is formed from thin, compact components. Hence, the overall dimensions of the assembly 10 are small in comparison to common torque-limiting devices. Furthermore, the torque-limiting assembly 10 has a minimal parts count, and does not rely on complicated mechanical interactions between its component parts. The components of the assembly 10 can be formed through relatively simple machining operations, and can be assembled without the use of fasteners. Hence, the torque-limiting assembly 10 can be fabricated at a relatively low cost, adds minimally to the overall parts count, weight, and dimensions of the mating component, and has a minimal potential for malfunction.

In addition to the above-noted advantages, the individual components of the torque-limiting assembly 10 are fairly robust, thus making the assembly 10 particularly suitable for use with machinery that produces high vibration levels. Also, the components can be fabricated from materials that are suitable for use in high-temperature or corrosive environments. In addition, the torque-limiting assembly 10 may easily be inspected for wear and other damage that can make the assembly 10 unsuitable for continued service. Furthermore, the tangs 46 can be formed from a material that fractures when subjected to stress levels above a particular value. This feature can be used to provide evidence that a torque transferred from a particular component was above a predetermined value.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, the invention can be incorporated into virtually any type of fitting to or from which torque is transferred. The invention is particularly useful for devices in which ratcheting-type motion between multiple discrete positions is desired, e.g., an automobile sun visor or an arm-mounted desk lamp designed to be selectively positioned by the user in a multitude of different orientations.

Figure 8:
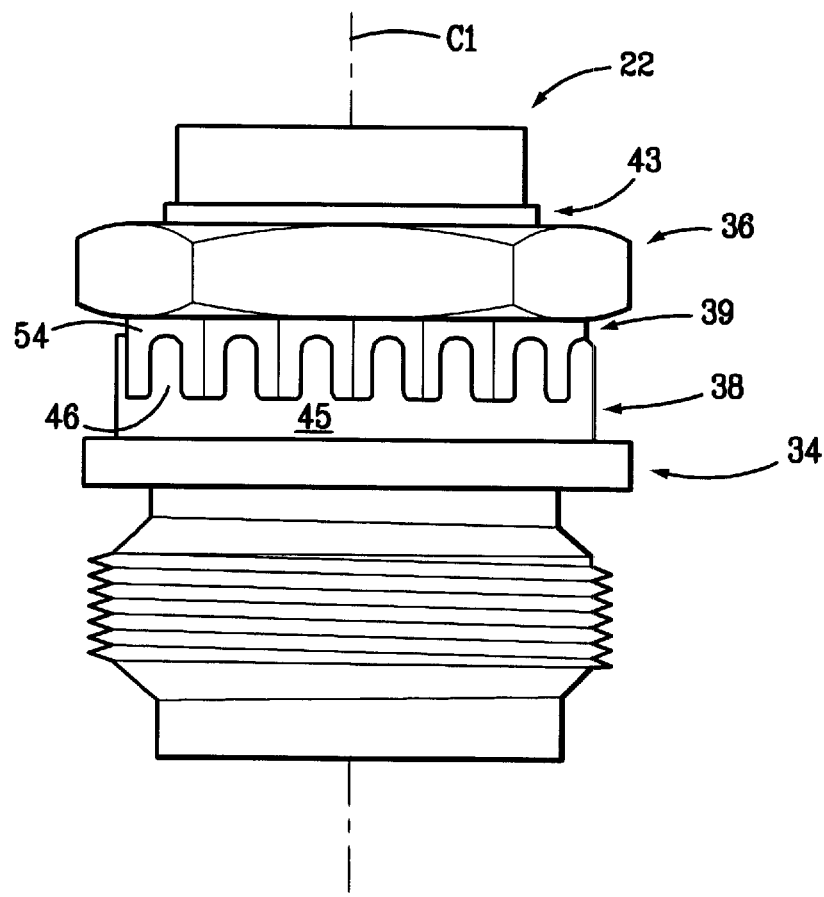
FIG. 8 is a is view of an alternative embodiment of the housing and the torque-limiting assembly shown in FIGS. 1 through 4.

Another potential embodiment in the invention is shown in FIG. 8. The locking ring 38 and the sleeve member 39 in this embodiment are reversed in comparison to the exemplary embodiment, i.e., the locking ring 38 is fixed to the housing main portion 22, and the sleeve member 39 is fixed to the collar 36.

Figure 9:
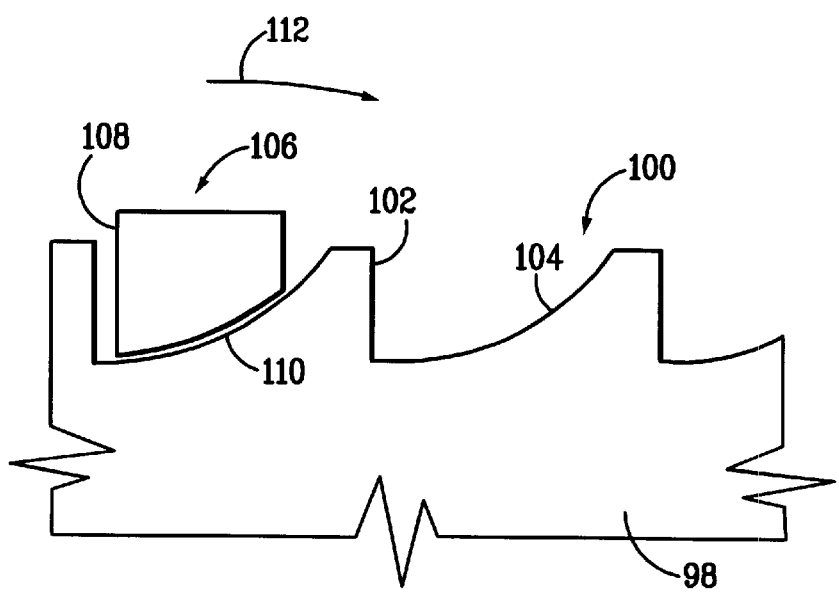
FIG. 9 is a bottom view of an alternative embodiment of a tang and a sleeve member of the torque-limiting assembly shown in FIGS. 1 through 3.

A further potential variation in the present invention is illustrated in FIG. 9. This particular variant incorporates a sleeve member 98 having contact surfaces 100. The contact surfaces 100 include a radially-oriented step 102 and an adjoining curvilinear portion 104. The illustrated variant also includes tangs 106 having a radially-oriented flat surface 108 and an adjoining curvilinear surface 110. These geometric features facilitate torque limiting in one direction only. Specifically, the applied torque is limited in the direction denoted by the arrow 112. The torque limiting function is accomplished in substantially the same manner as in the torque-limiting assembly 10, i.e., the tang surface 108 slips in relation to the curvilinear portion 104 when the applied torque exceeds a predetermined value.

The illustrated variant transfers substantially all of the applied torque in a direction opposite the arrow 112. Specifically, the step 102 of the sleeve member 98 abuts the surface 108 of the tang 106 when torque is applied in this direction. The abutment of the step 102 and the surface 108 causes a substantial entirety of the applied torque to be transferred to the sleeve member 98. This feature is particularly useful because the torque required to break a threaded fitting from its installed position is typically greater than the torque required to install the fitting. This phenomenon is due to factors such as corrosion and the need to overcome static friction. (Unidirectional torque limiting can also be facilitated by the use of a pawl positioned between the inner circumferential surface 42 of the collar 36 and the outer circumferential surface 24 of the housing main portion 22.)

Further variants of the locking ring 38 and the sleeve member 39 that are within the contemplated scope of the present invention are described in U.S. Pat. Nos. 5,083,819; 5,362,110; and 5,586,790, each of which is incorporated by reference herein in its entirety.

What is claimed is:

1. A torque-limiting assembly, comprising:
   a fitting;

a collar rotatably and coaxially coupled to the fitting and having a plurality of circumferentially-disposed surfaces for engaging a torque-applying device;

a sleeve member non-rotatably coupled to at least one of the collar and the fitting, the sleeve member having a plurality of contact surfaces disposed along a circumference of the sleeve member, each of the contact surfaces having a radially-oriented step and an adjoining curvilinear portion; and a locking ring non-rotatably coupled to at least one of the collar and the fitting, the locking ring having a plurality of elongate tangs extending from a portion of the locking ring in a substantially axial direction and being radially spaced from an axis of rotation of the fitting, each of the tangs having a radially-oriented flat surface and an adjoining curvilinear surface, wherein: the tangs are spaced apart so that the curvilinear surface of each of the tangs is adapted to securely engage one and not more than one of the curvilinear portions of the sleeve-member contact surfaces on a selective basis when a torque about equal to or less than a predetermined amount is applied to the collar in a first direction, thereby causing torque levels about equal to or less that the predetermined amount to be transferred to the fitting; the curvilinear surface of each of the tangs is adapted to slip over the curvilinear portions of the sleeve-member contact surfaces when a torque greater than the predetermined amount is applied to the collar in the first direction, thereby preventing torque levels greater than the predetermined amount from being transferred to the fitting; and the radially-oriented flat surfaces of the tangs abut the sleeve-member steps when a torque is applied to the collar in a second direction, thereby causing the torque applied in the second direction to be transferred to the fitting.

2. The device of claim 1, wherein the tangs flex radially and ratchet over junctures between the sleeve-member contact surfaces when the torque greater than the predetermined amount is applied to the collar.

3. The device of claim 2, wherein the sleeve-member contact surfaces have a substantially concave shape.

4. The device of claim 3, wherein the junctures between the sleeve-member contact surfaces are peak-shaped.

5. The device of claim 1, wherein the sleeve-member contact surfaces are disposed along an outer circumference of the sleeve member.

6. The device of claim 1, further including a retaining ring co-axially and non-rotatably coupled to the fitting proximate the collar.

7. The device of claim 6, wherein the retaining ring is a C-clip.

8. The device of claim 1, wherein the locking ring is non-rotatably coupled to the collar and the sleeve member is non-rotatably coupled to the fitting.

9. The device of claim 8, wherein the locking ring is fixed to a lower edge of the collar.

10. The device of claim 1, wherein each tang includes a knob projecting radially from a surface of the tang.

11. The device of claim 10, wherein each knob projects inward toward a central axis of the fitting.

12. The device of claim 1, wherein the plurality of tangs are substantially parallel to the axis of rotation of fitting.

13. The device of claim 1, wherein the plurality of collar surfaces are hexagonally arranged.

14. A housing for removably coupling a probe to a mounting structure, comprising:

a main portion having a central passage for removably receiving the probe and a plurality of threads for engaging the mounting structure in response to an installation torque applied in a first direction;

a collar rotatably and coaxially coupled to the main portion and having a plurality of circumferentially-disposed surfaces for transferring the installation torque;

a sleeve member non-rotatably coupled to at least one of the collar and the main portion, the sleeve member having a plurality of contact surfaces disposed along a circumference of the sleeve member, each of the contact surfaces having a radially-oriented step and an adjoining curvilinear portion; and a locking ring non-rotatably coupled to at least one of the collar and the main portion, the locking ring having a plurality of elongate tangs extending from a portion of the locking ring in a substantially axial direction and being radially spaced from a central axis of the main portion, each of the tangs having a radially-oriented flat surface and an adjoining curvilinear surface, wherein: the tangs are spaced apart so that the curvilinear surface of each of the tangs is adapted to non-rotatably engage one and not more than one of the curvilinear portions of the sleeve-member contact surfaces when the installation torque is about equal to or less than a predetermined limit, thereby causing the installation torque to be transferred to the main portion when the installation torque is about equal to or less than the predetermined limit; the curvilinear surface of each of the tangs is adapted to slip over the curvilinear portions of the sleeve-member contact surfaces when the installation torque is greater than the predetermined limit, thereby preventing the installation torque from being transferred to the main portion when the installation torque is greater than the predetermined limit; and the radially-oriented flat surfaces of the tangs abut the sleeve-member steps when a removal torque is applied to the collar in a second direction, thereby causing the removal torque to be transferred to the main portion.

15. The housing of claim 14, wherein the sleeve member is non-rotatably coupled to the main portion and the locking ring is non-rotatably coupled to the collar.

16. The housing of claim 14, wherein the plurality of threads are disposed along an outer circumference of the main portion and the central passage is defined by an inner circumferential surface of the main portion.

17. The housing of claim 14, wherein the sleeve-member contact surfaces have a substantially concave shape.

18. The housing of claim 14, further including a retaining ring co-axially and non-rotatably coupled to the main portion proximate the collar.

19. A chip-detector assembly for use with a machine having a lubrication system, comprising a probe having a chip-detecting element and a housing having:

a main portion including:

a central passage for removably receiving the probe; and an outer circumferential surface adapted to engage the machine in response to an installation torque applied to the housing in a first direction by a torque-applying device; and a torque-limiting assembly comprising:

a collar rotatably and coaxially coupled to the main portion and having a plurality of circumferentially-disposed surfaces for engaging the torque-applying device;

a sleeve member non-rotatably coupled to at least one of the collar and the main portion, the sleeve member having a plurality of contact surfaces disposed along a circumference of the sleeve member, each of the contact surfaces having a radially-oriented step and an adjoining curvilinear portion; and a locking ring non-rotatably coupled to at least one of the collar and the main portion, the locking ring having a plurality of elongate tangs extending from a portion of the locking ring in a substantially axial direction and being radially spaced from a central axis of the main portion, each of the tangs having a radially-oriented flat surface and an adjoining curvilinear surface, wherein: the tangs are spaced apart so that the curvilinear surface of each of the tangs is adapted to securely engage one and not more than one of the curvilinear portions of the sleeve-member contact surfaces when the installation torque is about equal to or less than a predetermined amount, thereby causing the installation torque to be transferred to the housing main portion when the installation torque is about equal to or less than the predetermined amount; the curvilinear surface of each of the tangs is adapted to slip over the curvilinear portions of the sleeve-member contact surfaces when the installation torque is greater than the predetermined amount, thereby preventing the installation torque from being transferred to the housing main portion when the installation torque is greater than the predetermined amount; and the radially-oriented flat surfaces of the tangs abut the sleeve-member steps when a removal torque is applied to the collar in a second direction, thereby causing the removal torque to be transferred to the housing main portion.

20. The chip-detector assembly of claim 19, further comprising a plurality of threads disposed along the outer circumferential surface of the housing main portion for engaging the mounting structure.

21. The chip-detector assembly of claim 19, wherein the sleeve member is non-rotatably coupled to the housing main portion and the locking ring is non-rotatably coupled to the collar.

22. The chip-detector assembly of claim 19, wherein the sleeve-member contact surfaces have a substantially concave shape.

23. The chip-detector assembly of claim 19, wherein the tangs flex radially and ratchet over junctures between the sleeve-member contact surfaces when the installation torque is greater than the predetermined amount.

24. The chip-detector assembly of claim 19, further comprising a retaining ring co-axially and non-rotatably coupled to the housing main portion proximate the collar.

25. The chip-detector assembly of claim 19, wherein the probe further includes a shaft coupled to the chip-detecting element and a probe collar coupled to the shaft.

\* \* \* \* \*